US005162711A

United States Patent [19]

Heckler

[11] Patent Number: 5,162,711

[45] Date of Patent: Nov. 10, 1992

[54] ELEVATOR DOOR CONTROL RESPONSIVE TO OBSTRUCTIONS

[75] Inventor: Mark Heckler, Ebikon, Switzerland

[73] Assignee: Inventio AG, Hergiswil, Switzerland

[21] Appl. No.: 615,006

[22] Filed: Nov. 16, 1990

[30] Foreign Application Priority Data

Nov. 27, 1989 [CH] Switzerland ........................ 04244/89

[51] Int. Cl.[5] ................................................ H02P 3/00

[52] U.S. Cl. .................................... 318/264; 318/282; 318/463; 187/103

[58] Field of Search ................................ 318/280-286, 318/255-257, 264-266, 268, 272, 65, 434, 618, 626, 632, 459, 453, 463, 464, 466-469; 187/100, 101, 103, 105, 108, 111, 118, 120, 133, 28, 51, 52 R, 29.1; 49/26-28, 43, 116, 138; 361/23, 33

[56] References Cited

U.S. PATENT DOCUMENTS

| | | | |
|---|---|---|---|
| 3,891,064 | 6/1975 | Clark | 187/28 |
| 3,977,497 | 8/1976 | McMurray | 187/28 |
| 4,085,823 | 4/1978 | Caputo et al. | 187/29.1 |
| 4,300,663 | 11/1981 | Hmelovsky et al. | 318/617 X |
| 4,367,810 | 1/1983 | Doane et al. | 187/29.1 |
| 4,501,343 | 2/1985 | Salihi | 187/29.1 |
| 4,776,433 | 10/1988 | Lagree et al. | 187/103 |
| 4,794,309 | 12/1988 | Saito et al. | 318/286 X |
| 4,804,067 | 2/1989 | Kähkipuro | 318/808 X |
| 4,898,263 | 2/1990 | Manske et al. | 187/133 |
| 4,980,618 | 12/1990 | Milnes et al. | 318/286 X |

FOREIGN PATENT DOCUMENTS

| | | |
|---|---|---|
| 213308 | 6/1986 | European Pat. Off. . |
| 2169105 | 7/1986 | United Kingdom . |

*Primary Examiner*—A. Jonathan Wysocki
*Attorney, Agent, or Firm*—William J. Clemens

[57] ABSTRACT

An apparatus and a method for protecting against a person being caught in a closing automatic door provides constant force values up to the few last millimeters of a door closing movement. A regulating error or difference signal representing the difference between the desired door motor speed and the actual motor speed is generated during the door closing travel and is continuously compared with a maximum predetermined tolerance signal produced by a target value generator and a door stop with subsequent reversing is initated if the tolerance value is exceeded. A learning travel computer, during periodic learning travels, determines values for mass compensation and for friction compensation and adds these values to generate a compensation signal which is added to the difference signal as an input to a regulator for controlling the door motor through an electronic switching system. Thus, the response values for stopping and reversing of the door remain constant even though the characteristics of the door operating apparatus may change.

6 Claims, 6 Drawing Sheets

ELEVATOR DOOR CONTROL RESPONSIVE TO OBSTRUCTIONS

BACKGROUND OF THE INVENTION

The present invention concerns generally a method and an apparatus for controlling automatic doors and, in particular, means for reducing the danger of catching a person in closing automatic doors for elevators.

Elevator safety regulations require safety devices which will prevent elevator users from being caught between closing elevator doors. The problem of providing such safety devices is typically solved by utilizing electomechanical closing force limiters which include a resilient element that is deflected when an impermissibly high force is exerted on the door. Upon deflection, the limiter actuates an electrical contact connected to a door control which initiates a reversing of the door driving motor to open the door.

A solution to the above described problem, in which an impermissible force influence on the door is detected without utilizing an electromechanical system, is shown in the U.S. Pat. No. 4,563,625. A voltage drop proportional to the motor current is interpreted as a torque value by means of a measuring resistor in the motor current circuit and is compared with an adjustable limit value. When the voltage exceeds the limit value, door stopping and reversing operations are initiated.

A substantial disadvantage of the above described solution is that the closing force must never exceed the maximum value which is permitted by the applicable safety regulations. This limitation reduces the accelerating force of the drive unnecessarily and eliminates the possibility of advantageously overloading an electric motor on a short term basis. Furthermore, in the case of a gradual change in the efficiency of the mechanical drive system, the consequence is a faulty response since the voltage drop no longer represents the actual torque and thus a false door fault is indicated.

SUMMARY OF THE INVENTION

The present invention is based on the task of creating a method and an apparatus for providing a door closing force limitation without additional discrete measuring and switching circuits limiting the door closing motor performance. An apparatus for automatically operating the car doors in an elevator system moves the door leaves of a car door by means of a door motor and the door leaves of a shaft door by way of entraining members mounted on the car door leaves. The door leaves are moved between a closed end position and an open end position and the apparatus permits the car door leaves to stop in any position between the end positions, move further in the same direction or reverse.

The apparatus according to the present invention includes a microprocessor control having an input and an output, an electronic switching system having an input connected to the output of the microprocessor control and an output, a direct current motor connected to the output of the electronic switching circuit and mechanically coupled to drive elevator car door leaves and a digital tachometer mechanically coupled to the motor and having an output connected to the input of the microprocessor control for generating an actual speed signal representing the instantaneous speed of the motor to the microprocessor control. The microprocessor control is responsive to the actual speed signal for generating a regulating error difference signal "dV" produced by an external interference force acting upon the car door leaves of the closing elevator door, compares a value of the difference signal "dV" with a value of a predetermined tolerance signal "dVmax" and initiates stopping and reversing of direction of the closing car door leaves when a value of the difference signal "dV" exceeds a value of the predetermined tolerance signal "dVmax".

The advantages achieved by the invention are that the response force of the closing force limitations remains constant and that the protection against being caught is assured to the last millimeter of the closing movement. A further advantage lies in that many different types of presently installed elevator control equipment can be used to implement the method according to the present invention and that the capabilities of the door drive motor can be exploited better. In particular, the present invention can be used advantageously in the case of elevators having a door drive which moves the door leaves of the car door by means of a motor with an intermediate gear coupled to a linear drive and moves the door leaves of a shaft door by way of mechanical coupling members on the car door between closed and open positions and which allows the door leaves to be moved further in the same direction or reversed in every setting between both the "open" and "closed" end positions.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

FIG. **4*a* is schematic block diagram of the components for generating the travel curve shown in FIG. 4.

DESCRIPTION OF THE PREFERRED EMBODIMENT

Figure 1:
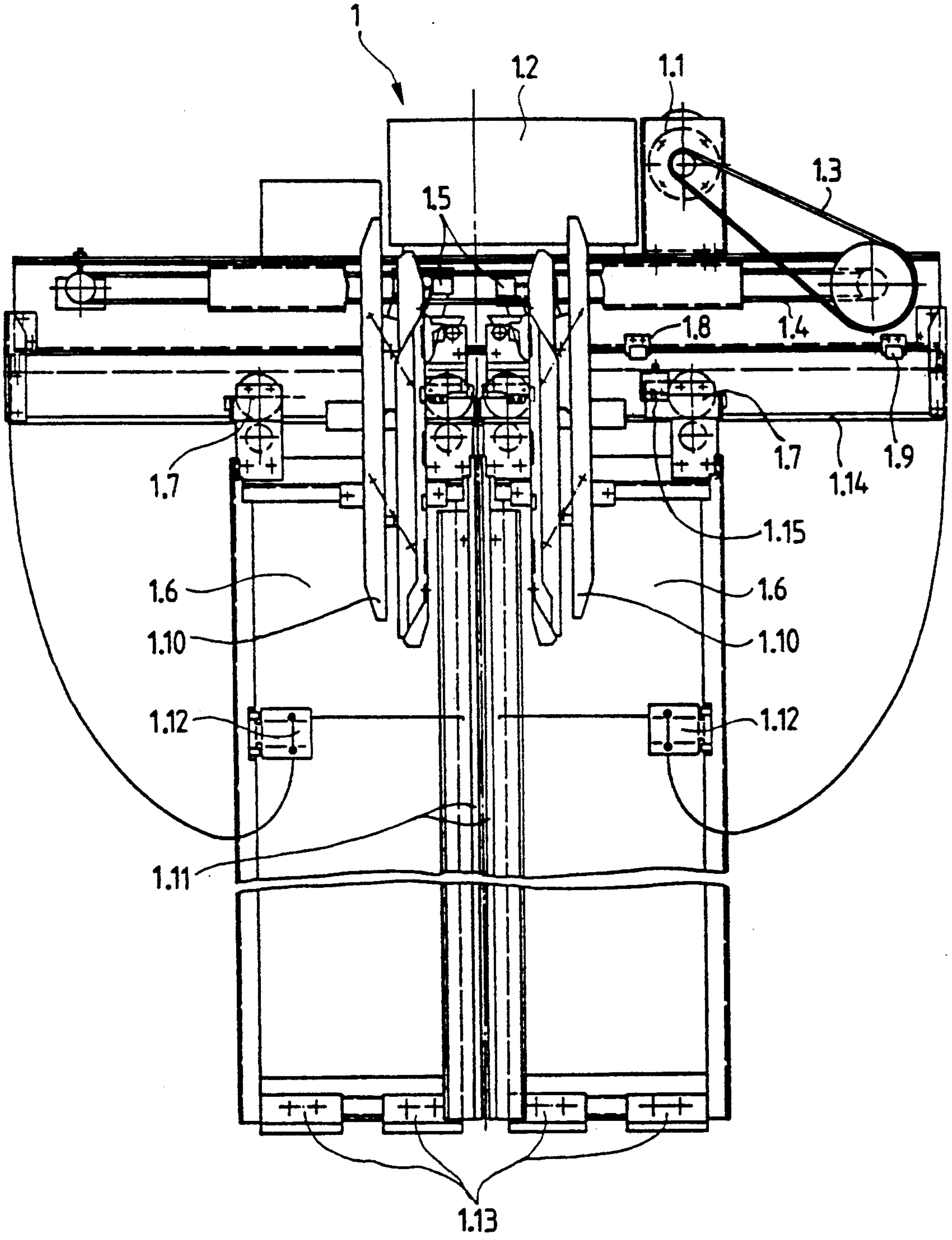
FIG. 1 is a front elevation of an elevator car automatic door operating apparatus.

An automatic door operating apparatus 1 for an elevator car is shown in FIG. 1. The apparatus 1 includes drive means mounted on the roof of the car and having a door drive motor 1.1 connected to a door drive control 1.2 and coupled through an intermediate drive belt 1.3 to a linear door drive belt 1.4. A pair of door leaves 1.6 are suspended by door rollers 1.7 and are directed at lower edges by guide members 1.13 for horizontal movement. Abutting vertical edges of the door leaves 1.6 have safety strips 1.11 connected to control plates 1.12. Door clamping members 1.5 secure the door leaves 1.6 to the belt 1.4 and splayable shaft door entraining members 1.10 are mounted on the door leaves 1.6 for engaging the shaft or hositway doors (not shown) at each floor in a conventional manner. A switching cam 1.15 is located at the upper edge of the right-hand door leaf 1.6 for actuating a limit switch 1.9 in the open setting of the door leaves and a limit switch 1.8 in the closed setting of the door leaves.

Figure 2:
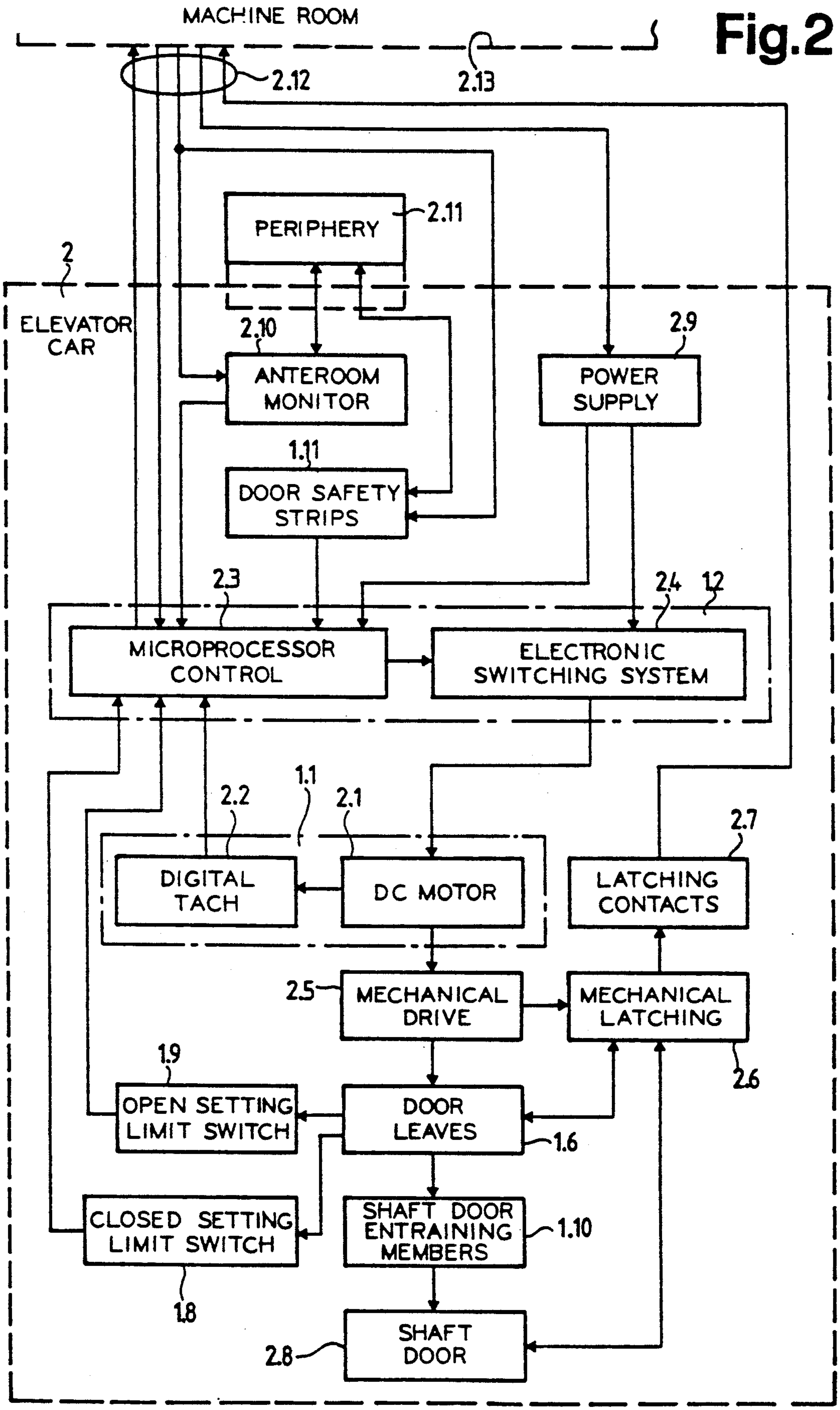
FIG. 2 is a schematic block diagram of a control system for the door operating apparatus of FIG. 1 in accordance with the present invention.

FIG. 2 is a schematic block diagram of the control system for the door operating apparatus of FIG. 1 showing the functional elements and their relation one to the other on an elevator car 2. The door drive control 1.2 includes a microprocessor control 2.3 connected to generate signals to an electronic switching system 2.4. The door motor 1.1 includes a direct current (DC) motor 2.1 connected to receive operating power from the system 2.4 and a digital tachometer 2.2 connected to the motor 2.1 for generating a signal proportional to the motor speed to the microprocessor 2.3. The drive elements 1.3, 1.4 and 1.5, illustrated in FIG. 1, are combined in a mechanical drive 2.5 coupled between the output of the motor 2.1 and the door leaves 1.6. The shaft door entraining members 1.10, attached to the door leaves 1.6, act on a shaft door 2.8. The functional elements 2.5. 1.6 and 2.8 cooperate with a mechanical latching means 2.6 which actuates latching contacts 2.7. The limit switches 1.8. and 1.9, which are actuated by the car door leaves 1.6 by way of the switching cam 1.15 (FIG. 1), are connected as inputs to a control logic portion, which is not illustrated in FIG. 2, in the microprocessor control 2.3. The control 2.3 and the latching contacts 2.7 generate the appropriate signals to a machine room 2.13 through a suspension cable 2.12. The door safety strips 1.11 and an hall monitor 2.10 respond to changes in conditions at a periphery 2.11 or outside the car and are connected with the microprocessor control 2.3 as well as with the machine room 2.13 in which an elevator control (not shown) is located. The microprocessor control 2.3 is connected through the cable 2.12 to receive control signals from the elevator control in the machine room 2.13. A power supply 2.9 is connected through the cable 2.12 to receive electrical power from the machine room 2.13 and supplies that power to the door drive control 1.2.

Figure 3:
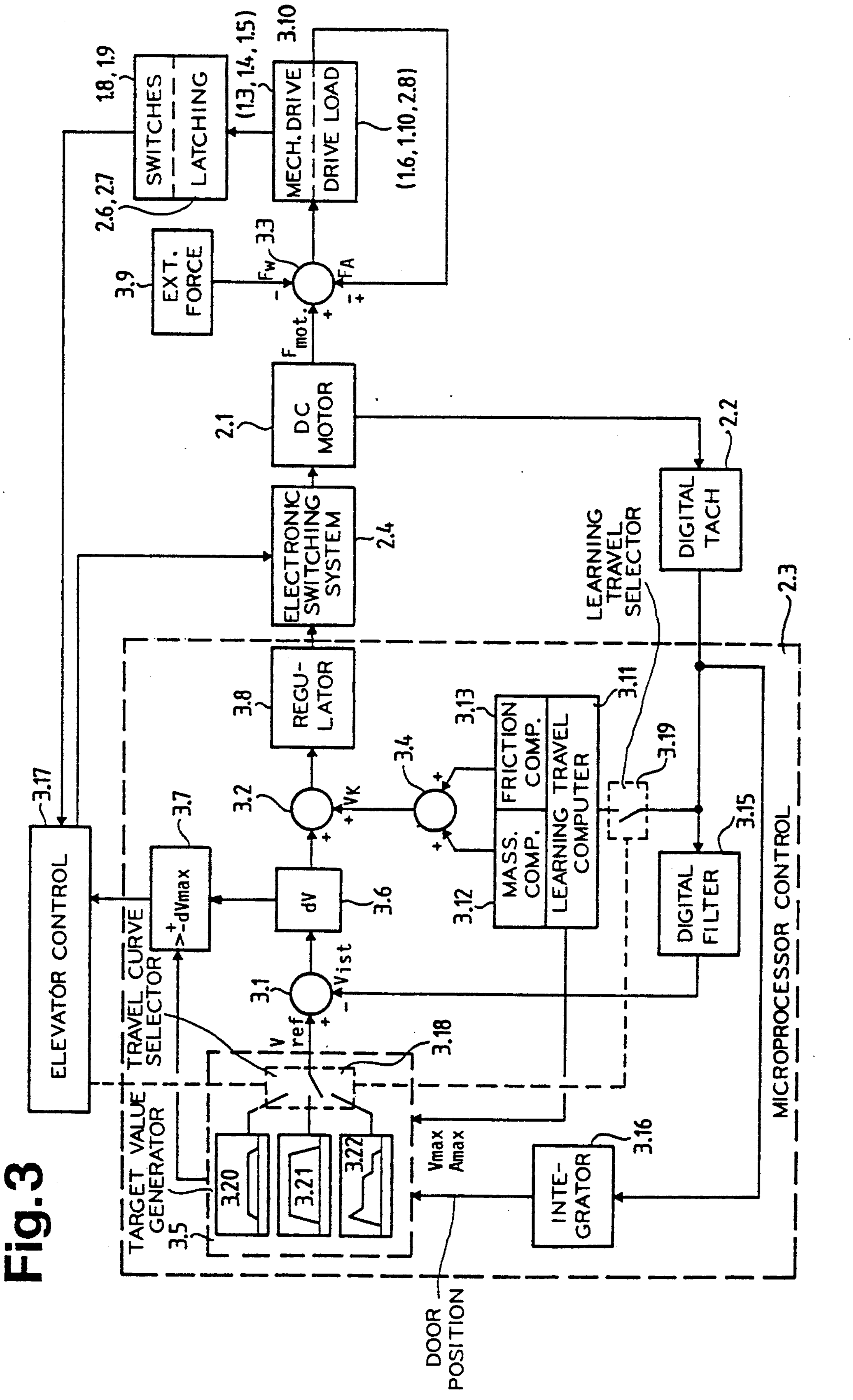
FIG. 3 is a schematic block diagram showing the microprocessor control of FIG. 2 in more detail and the connections to the door drive mechanisms.

FIG. 3 is a schematic block diagram showing the microprocessor control of FIG. 2 in more detail and the connections to the door drive operating apparatus. The large dashed line block 2.3 shows all of the elements of the door motor regulation circuit according to the present invention. A target value generator 3.5 (the smaller dashed block) generates a plurality of travel curves as target speed signals 3.20, 3.21 and 3.22, which curves are stored in memories, and includes a travel curve selector 3.18 which is connected to the memories and is controlled by (dashed line) an elevator control 3.17. A target speed signal "Vref" is generated by the target value generator 3.5 to a first subtractor 3.1, at which an actual speed signal "Vist" is subtracted as generated from the digital tachometer 2.2 connected through a digital filter or digital-to-analog converter 3.15. The signal "Vref" represents the desired speed and the signal "Vist" represents the actual speed for the motor 2.1. The output of the first subtractor 3.1 is connected to an input of a difference value generator (dV) 3.6 which has a first output connected to a limit value comparator 3.7 and a second output connected to a second subtractor 3.2. The limit value comparator 3.7 has a second input connected to receive positive and negative tolerance signals "dVmax" from the target value generator 3.5 and generates appropriate signals to the elevator control 3.17 when the difference signal "dV" exceeds a positive or negative value of the tolerance signal "dVmax".

A learning travel selector 3.19, controlled by the elevator control 3.17, activates a learning travel computer 3.11 which determines values for a mass compensator 3.12 and a friction compensator 3.13. A fourth subtractor 3.4 is connected to receive and add the values from the compensators and the sum is conducted to the second subtractor 3.2 as a compensation signal "Vk". The output of the second subtractor 3.2 is an input to a regulator 3.8 in which the appropriate magnitude is selected for generating the value to the electronic switching system 2.4. A second input to the electronic switching system 2.4 is connected with the lift control 3.17. The direct current motor 2.1 is driven by the electronic switching system 2.4 utilizing the principle of pulse width modulation.

The motor force "Fmot" is an input to a third subtractor 3.3 having an output to a drive load 3.10 the reaction of which generates a drive counterforce "FA" as an input to the subtractor 3.3. An external interference force 3.9 created by an obstruction acts as a negative force "Fw" input to the third subtractor 3.3. The latching elements 2.6 and 2.7 and the limit switches 1.8 and 1.9 are connected between the drive load 3.10 and the elevator control 3.17. The connection of the direct current motor 2.1 with the digital tachometer 2.2 is mechanical. The digital tachometer 2.2 has an output connected to an input of the digital filter 3.15, through the learning travel selector 3.19 to an input of the learning travel computer 3.11, and through an integrator 3.16 to one of the inputs of the target value generator 3.5. An output of the learning travel computer 3.11 is connected to the other input of the target value generator 3.5 to provide a maximum velocity signal "Vmax" and a maximum acceleration signal "Amax".

Figure 4:
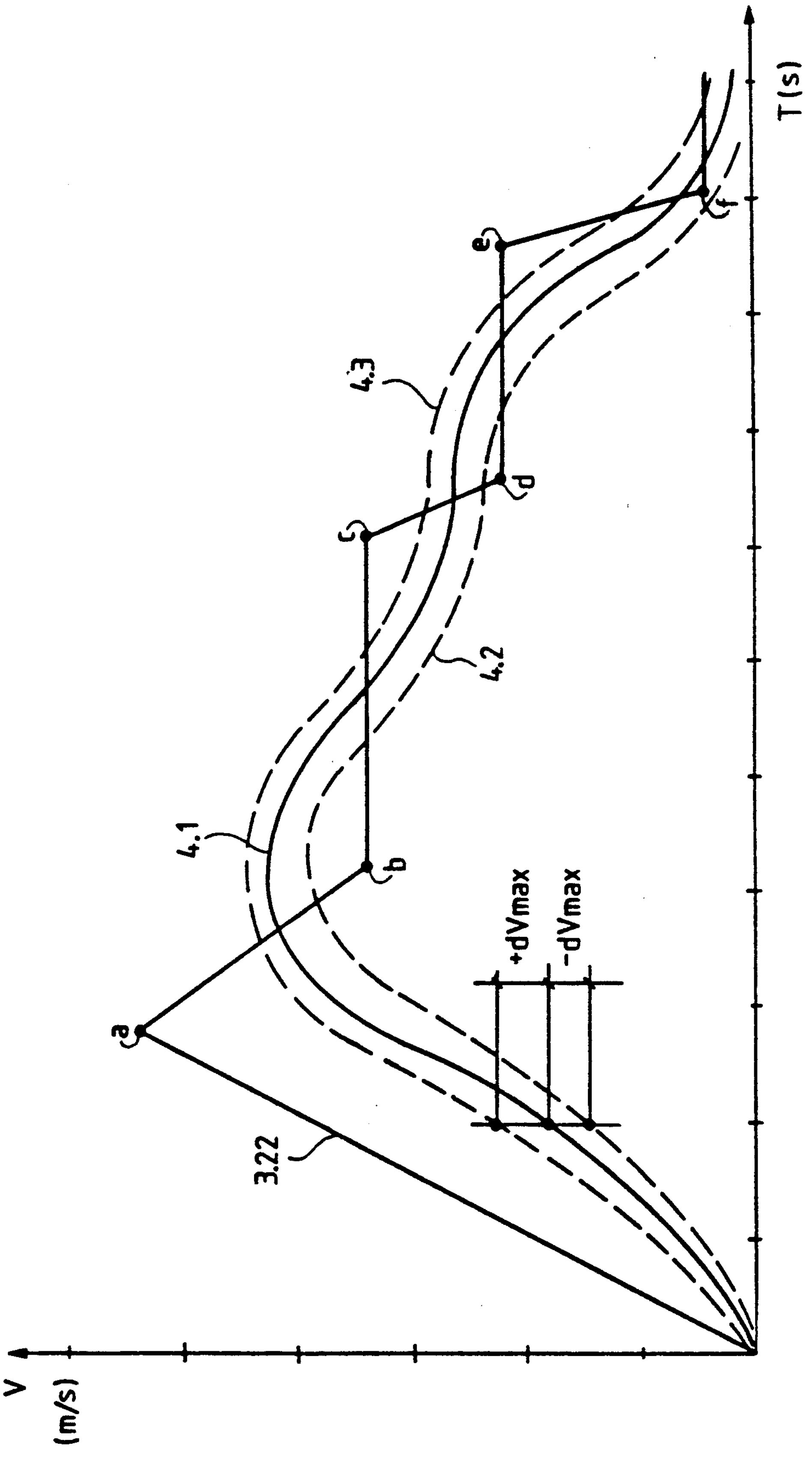
FIG. 4 is a velocity versus time travel curve for a closing elevator door generated by the microprocessor control shown in FIG. 3.

FIG. 4 shows a velocity "V(m/s)" versus time "T(s)" travel curve for a closing elevator door generated by the microprocessor control shown in FIG. 3. The closing travel curve 3.22 is formed of straight line segments connected by corner or break points a, b, c, d, e and f. A real target curve 4.1 is produced from the closing travel curve 3.22 by filter circuits that round off. A positive tolerance curve 4.3 with a spacing "+dVmax" and a negative tolerance curve 4.2 with a spacing "−dVmax" are generated from the real target curve 4.1.

Figure 4A:
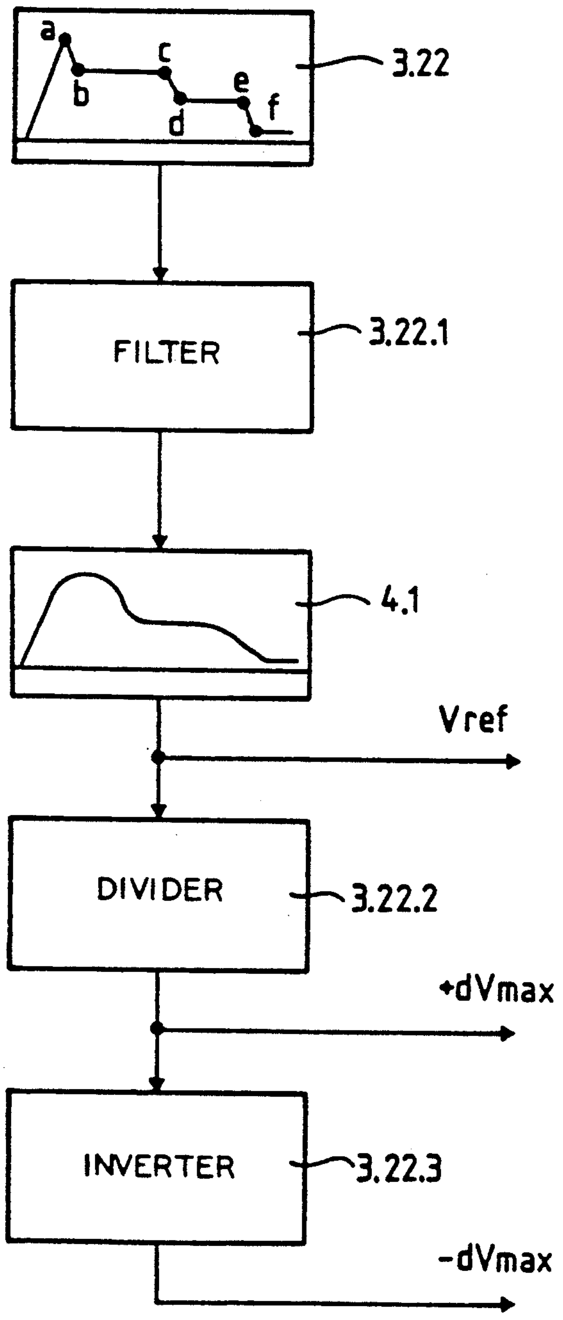

The curves shown in FIG. 4 represent a process carried out by the components for generating the travel curve shown in the schematic block diagram of FIG. 4*a*. A filter 3.22.1 rounds off the corners of the closing travel curve 3.22 so that the real target curve 4.1 is generated. The curve 4.1 is present as the target speed signal "Vref" at the output of the target value generator 3.5. The target speed signal is also conducted to a divider 3.22.2 which continuously determines, for example, a five percent component of the instantaneous real target curve 4.1 to obtain the positive tolerance limit value "+dVmax". The negative tolerance limit value "−dVmax" is formed in a following inverter 3.22.3.

Figure 5:
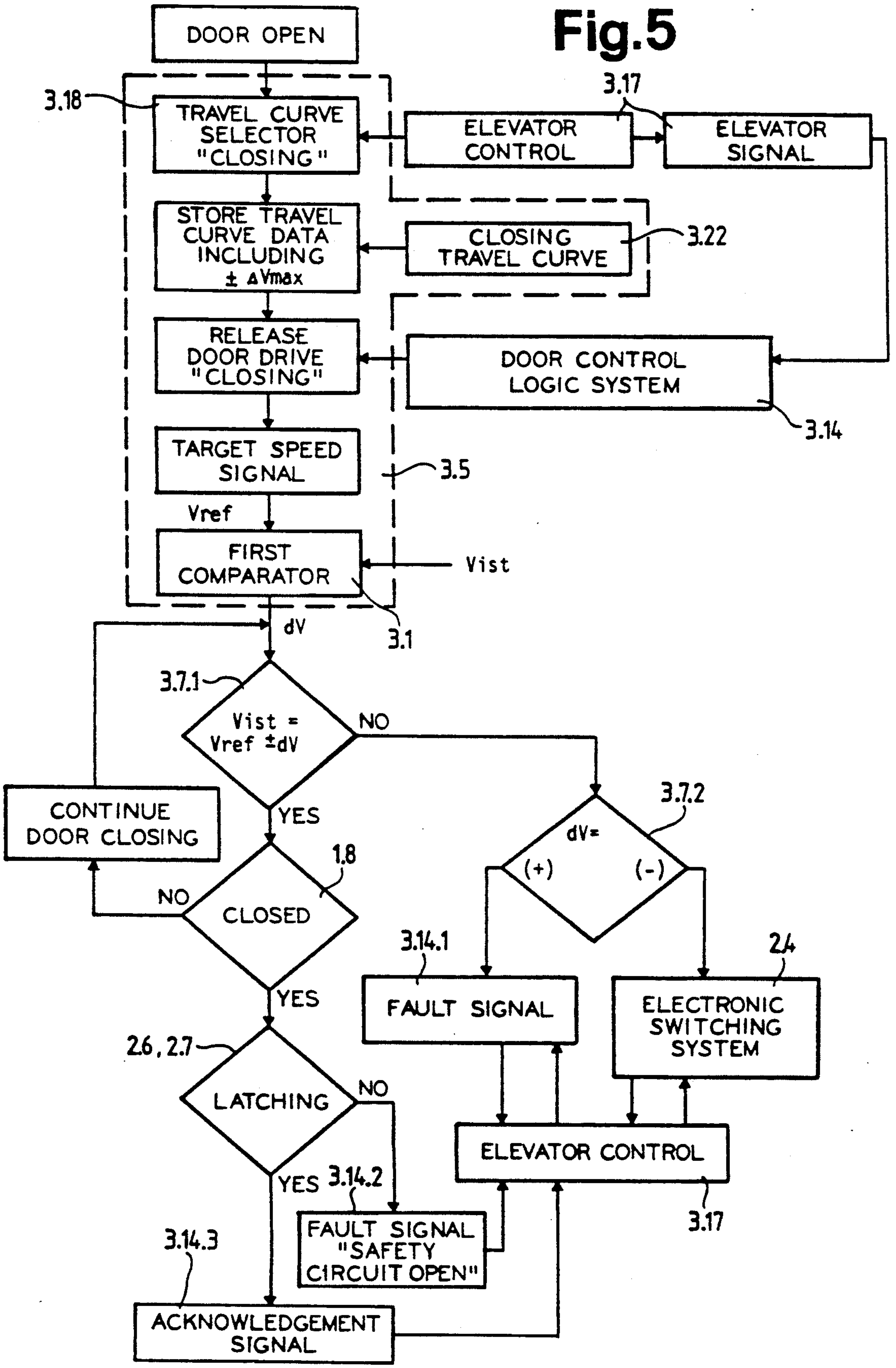
FIG. 5** is a flow diagram of the method of controlling an elevator car automatic door apparatus in accordance with the present invention.

FIG. 5 is a flow diagram which illustrates the functions of closing the elevator door. By reference to this diagram and FIG. 3, the mode of operation of the present invention is explained in more detail as follows. With the door open and a travel command being present for the elevator, the travel curve selector 3.18 is controlled by the elevator control 3.17 to select the setting "closing". For example, the control 3.17 can generate a storage address for calling the closing travel curve 3.22 from the memory. The curve is typically filed as a number of straight lines with the corner points a, b, c, d, e and f. These corner points are defined during the first learning travel of the car and lie, for example, at thirty percent for a, at fifty percent for b, at seventy percent for c, at seventy five percent for d, at eighty-five percent for e and at ninety five percent for f of the entire closing travel path of the door.

After the expiration of the time for which the door is held open "DOOR OPEN", and when no obstacle detection signal is present, the release of the door travel "closing" is initiated by a door control logic system 3.14. The target speed signal "Vref" then is generated according to the real target curve 4.1 and applied to the first subtractor 3.1. The actual speed signal "Vist", which originates from the digital tachometer 2.2 and is converted into an analog value in the digital-to-analog converter 3.15, is generated to the first subtractor 3.1. The difference between the input values is then generated as the regulating error or difference signal "dV".

In the limit value comparator 3.7 shown in FIG. 3, the regulating error "dV" is tested for its maintenance of tolerance. In the undisturbed normal case, when "dV" is less than "dVmax", the compensation value "Vk" supplied from the fourth subtractor 3.4 is added to the value "dV" in the second comparator 3.2 and the input signal for the regulator 3.8 is formed. The regulator 3.8 generates the drive signal for the electronic switching system 2.4, which in its turn controls the direct current motor 2.1 by pulse width modulation. The motor force "Fmot" is counteracted by the reaction force "FA" which is caused by the driving load 3.10 and has negative values during acceleration and positive values during deceleration. The third subtractor 3.3 shown in FIG. 3 merely illustrates the force comparison and is not present in the invention. In the normal case, the external interference force 3.9, or "Fw" is not effective. The shape of the real target curve 4.1 is controlled in dependence on the door travel as signalled by the digital tachometer 2.2 through an integrator 3.16 connected to the target value generator 3.5.

The above described undisturbed normal case is represented in FIG. 5 by the decision point 3.7.1 with an exit at "YES". The closing operation continues in a loop through the "NO" exit from a decision point representing the "closed" limit switch 1.8 and back to the input of the decision point 3.7.1. At the conclusion of the closing operation, a "YES" exit from the decision point 1.8 leads to the mechanical and electrical latching at a decision point 2.6 and 2.7 which latching takes place as well as a holding-closed of the closed and latched door with reduced motor force, or by a holding brake not illustrated here. These functions are likewise controlled by the elevator control 3.17 by way of the door control logic system 3.14. A fault signal "SAFETY CIRCUIT OPEN" 3.14.2 is generated from a "NO" exit from the latching decision point in the case of faulty electrical latching and an "ACKNOWLEDGEMENT SIGNAL" 3.14.3 is generated in the normal case from a "YES" exit from the latching elements decision point 2.6 and 2.7 to the elevator control 3.17.

However, the present invention relates to the fault case which is described as follows. The external interference force 3.9 arises when the door moves against an obstacle, wherein it is assumed for this example that the safety strips 1.11 and the hall monitor 2.10 are intentionally or unintentionally ineffective. The description begins at the limit value comparator 3.7 in the flow diagram of FIG. 5, wherein the function is divided into two steps. The limit value being exceeded is ascertained in the first step at the decision point 3.7.1 and the polarity is determined in a second step at a decision point 3.7.2 following a "NO" exit from the first step.

A negative polarity value of "dV" signifies that the value of the actual speed signal "Vist" has fallen below the instantaneous value of the real target curve 4.1, or "Vref", by more than "−dVmax". A positive value signifies that the value of the signal "Vist" has exceeded the instantaneous value of "Vref" by more than "+dVmax". The latter value can, for example, occur in the case of a belt rupture causing the direct current motor 2.1 to suddenly speed up for a short time until the motor speed is regulated which generates such values by way of the digital tachometer 2.2 and the digital filter 3.15. A "FAULT SIGNAL" 3.14.1 is generated as a consequence of a positive polarity value (+) exit from the decision point 3.7.2, whereupon a switching off of the door drive motor takes place by way of the elevator control 3.17 or the door control logic system 3.14. When the closing door is obstructed or braked by an external interference force 3.9, a negative excess arises, "dV" thus being more negative than "−dVmax". In this case, the exit from the decision point 3.7.2 is at the negative polarity value(−) and the direct current motor is braked electrodynamically by the electronic switching system 2.4, and possibly mechanically, to a standstill and a reversing, thus an opening movement, is initiated.

The question must still be answered i this context as to why "−dVmax" is exceeded in the case of a permissible maximum force of one hundred fifty newtons, for example. The motor characteristic and the regulation amplification factor result in a reproducible regulating error "dV" for a certain external interference force 3.9. Both of these factors permit the corresponding positive tolerance curve 4.2 and, above all, the negative tolerance curve 4.3 to be defined. It is demanded that the response values for a stopping and a reversing remain constant. This constant values condition is achieved by the addition of the compensation signal "Vk" in the second subtractor 3.2. The compensation signal "Vk" is redetermined during each learning travel as explained below.

The target value generator 3.5, as initially mentioned, generates a learning travel curve 3.20 which can be called up by the elevator control 3.17 by means of the travel curve selector 3.18. At the same time, the learning travel selector 3.19 is activated and the learning travel is performed as a closing movement at a constant and very low speed. The value over time of the regulating error or difference signal "dV" registered by the learning travel computer provides the indication of the mass to be accelerated in the acceleration phase and the information about the friction conditions over the entire course of travel is provided with the aid of the ascertained regulating error "dV". A mass compensation value is calculated from the first and a friction compensation value is calculated from the second. Both the compensation values added together in the fourth subtractor 3.4 are then input to the second subtractor 3.2 during each normal closing travel of the door. In this manner, slowly changing friction conditions are continuously compensated for and the response value for the closing force limitation is maintained constant.

The very first learning travel typically serves for the travel data detection, whereby the corner points, accelerations and speeds for the travel curves 3.21 and 3.22 are then defined. Learning travels can be performed at desired time intervals according to need. There can, for example, be one learning travel each twenty-four hours or even on each door closure without a travel command for the elevator car.

In the case of excessive or a predetermined worsening of efficiency, no compensation values "Vk" are produced, but a corresponding fault signal is generated instead to the elevator control. For a speedy acceleration and thereby also for a high attainable door speed, in particular for the opening movement, correspondingly high motor currents are required. By reason of the existing thermal inertia of an electrical or direct current motor, such a motor can be loaded for a short time without damage by very high currents which amount to a multiple of the permissible continuous current. The current is limited only by the carbon brushes and the commutator which can, however, be dimensioned appropriately. It is advantageous to provide current limitation in the form of an electronic fuse as protection for the semiconductors in the electronic switching system.

It is furthermore desirable that the protection against being caught in the door remains effective until the end of the closing movement. It is possible with the above described method and apparatus to permit the closing force limitation to function until the last millimeter of the closing movement. This is particularly effective against catching and injuring narrow human limb masses, such as, for example, hands and fingers, and also for articles of clothing. The importance of the protection against being caught in the last phase of the closing movement of the door has a further aspect. As FIG. 1 shows, the elevator door automatic operating apparatus 1 is normally equipped with the safety strips 1.11. However, these strips fulfil their functions only when they are a predetermined distance from the other. When the front edges of the door have approached within five to two centimeters of each other during a closing movement, the detection systems of the safety strips must become less sensitive or even be switched off to prevent self detections.

The present invention fulfills the need for complete protection against being caught in an elevator door up to the last millimeter of door travel. Furthermore, in the end phase of the closing movement, the door speed is so low that the dynamic force components are negligibly small and only the static portion is acting. Thus, the response values of the closing force limitation, for the purpose of still better protection of the elevator users, can be set appreciably below the prescribed maximum value without impairment of the door operations. The method and the apparatus described above can be used for any kind of automatic doors and are not restricted to the field of elevators. For example, entry doors of hotels, commercial and residential buildings, as well as doors of railway and road vehicles can be equipped with the described invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for automatically operating car doors in an elevator system having a door operating apparatus which moves door leaves of a car door by means of a door motor and door leaves of a shaft door by way of entraining members on the car door leaves between a closed end position and an open end position and which permits the car door leaves to stop in any position between the end positions, move further in the same direction or reverse, comprising the steps of:

a. generating a regulating error difference signal "dV" representing a difference between an desired speed of door closing and an actual speed of door closing produced by an external interference force acting upon car door leaves of a closing elevator door;

b. comparing a value of said difference signal "dV" with a value of a predetermined tolerance signal "dVmax";

c. initiating stopping and reversing of direction of the closing car door leaves when a value of said difference signal "dV" exceeds a value of said predetermined tolerance signal "dVmax"; and d. generating respective positive and negative tolerance curves from a target value curve representing the desired speed of door closing versus time and obtaining said predetermined tolerance signal "dVmax" as a difference between said target value curve and each of said tolerance curves as a function of time and performing the step c. when said value of said difference signal "dV" is negative and exceeds said difference between said target value curve and said negative tolerance curve.

2. The method according to claim 1 including a step of generating a compensation signal "Vk" and adding said compensation signal "Vk" to said difference signal "dV" for maintaining a ratio of the external interference force to said value of said difference signal "dV" constant, said value of said compensation signal "Vk" being generated by adding a mass compensation value determined during a learning travel of the car door leaves and a friction compensation value.

3. The method according to claim 1 including a step of closing the car door leaves in the absence of a travel command for the elevator car for generating and storing values for a compensation signal "Vk" and adding said compensation signal to said difference signal "dV".

4. An apparatus for automatically operating car doors in an elevator system having a door operating apparatus which moves door leaves of a car door by means of a door motor and door leaves of a shaft door by way of entraining members on the car door leaves between a closed end position and an open end position and which permits the car door leaves to stop in any position between the end positions, move further in the same direction or reverse, comprising:

a microprocessor control for storing a target speed signal and having an input and an output;

an electronic switching system having an input connected to said output of said microprocessor control and an output;

a direct current motor connected to said output of said electronic switching circuit and mechanically coupled to drive elevator car door leaves;

a digital tachometer mechanically coupled to said motor and having an output connected to said input of said microprocessor control for generating an actual speed signal representing the instantaneous speed of said motor to said microprocessor control whereby said microprocessor control is responsive to said target speed signal and said actual speed signal for generating a regulating error difference signal "dV" produced by an external interference force acting upon the car door leaves of the closing elevator door, for comparing a value of said difference signal "dV" with a value of a predetermined tolerance signal "dVmax" and for initiating stopping and reversing of direction of the closing car door leaves by controlling said electronic switching system and said motor when a value of said difference signal "dV" exceeds a value of said predetermined tolerance signal "dVmax"; and said microprocessor control including a target value generator for generating a plurality of different target speed signals and having a pair of inputs and a pair of outputs, a first subtractor having an input connected to one of said outputs of said target value generator and having another input and an output, a travel curve selector for connecting one of said target speed signals to said one output of said target value generator, a difference value generator having an input connected to said output of said first subtractor and a pair of outputs, a limit value comparator having an input connected to one of said outputs of said difference value comparator and another input connected to the other one of said outputs of said target value generator and an output connected to an elevator control, a second subtractor having an input connected to the other one of said outputs of said difference value generator and having another input and an output, a regulator connected between said output of said second subtractor and said input of said electronic switching system, a learning travel computer having an input and three outputs, one of said outputs being connected to one of said inputs of said target value generator, a learning travel selector connected between said output of said digital tachometer and said input of said learning travel computer, another subtractor having a pair of inputs connected to the other two of said three outputs of said learning travel computer and an output connected the other one of said inputs of said second subtractor, a digital filter connected between said output of said digital tachometer and the other one of said inputs of said first subtractor, and an integrator connected between said output of said digital tachometer and the other one of said inputs of said target value generator.

5. The apparatus according to claim 4 wherein said target value generator includes a filter, a divider and an inverter connected in series, at least one of said target speed signals is stored in said target value generator as a series of straight lines connected by break points and is passed through said filter to generate said one target speed signal at said one output of said target value generator, said one target speed signal is passed through said divider to generate said predetermined tolerance signal "dVmax" having a positive value and said predetermined tolerance signal is passed through said inverter to generate said predetermined tolerance signal "dVmax" having a negative value.

6. An apparatus for automatically operating car doors in an elevator system having a door operating apparatus which moves door leaves of a car door by means of a door motor and door leaves of a shaft door by way of entraining members on the car door leaves between a closed end position and an open end position and which permits the car door leaves to stop in any position between the end positions, move further in the same direction or reverse, comprising:

a microprocessor control for storing a target speed signal and having an input and an output;

an electronic switching system having an input connected to said output of said microprocessor control and an output;

a direct current motor connected to said output of said electronic switching circuit and mechanically coupled to drive elevator car door leaves;

a digital tachometer mechanically coupled to said motor and having an output connected to said input of said microprocessor control for generating an actual speed signal representing the instantaneous speed of said motor to said microprocessor control whereby said microprocessor control is responsive to said target speed signal and said actual speed signal for generating a regulating error difference signal "dV" produced by an external interference force acting upon the car door leaves of the closing elevator door, for comparing a value of said difference signal "dV" with a value of a predetermined tolerance signal "dVmax" and for initiating stopping and reversing of direction of the closing car door leaves by controlling said electronic switching system and said motor when a value of said difference signal "dV" exceeds a value of said predetermined tolerance signal "dVmax"; and wherein said microprocessor control includes a filter, a divider and an inverter connected in series, at least one target speed signal is stored in said microprocessor control as a series of straight lines connected by break points and is passed through said filter to generate said one target speed signal at said one output of said target value generator, said one target speed signal is passed through said divider to generate said predetermined tolerance signal "dVmax" having a positive value and said predetermined tolerance signal is passed through said inverter to generate said predetermined tolerance signal "dVmax" having a negative value.

* * * * *